(12) United States Patent
MacPherson

(10) Patent No.: US 12,518,661 B2
(45) Date of Patent: Jan. 6, 2026

(54) DEVICE, SYSTEM AND METHOD FOR CONTROLLING A LIGHT SOURCE AND LOWEST BRIGHTNESS REGIONS OF A LIGHT MODULATOR

(71) Applicant: CHRISTIE DIGITAL SYSTEMS USA, INC., Cypress, CA (US)

(72) Inventor: James MacPherson, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 62 days.

(21) Appl. No.: 18/392,218

(22) Filed: Dec. 21, 2023

(65) Prior Publication Data

US 2025/0209944 A1    Jun. 26, 2025

(51) Int. Cl.
*G09G 3/00* (2006.01)
*G09G 3/06* (2006.01)
*G09G 3/34* (2006.01)

(52) U.S. Cl.
CPC .............. *G09G 3/001* (2013.01); *G09G 3/06* (2013.01); *G09G 3/346* (2013.01); *G09G 2320/0626* (2013.01)

(58) Field of Classification Search
CPC ...... H04N 5/74; H04N 5/7408; H04N 5/7416; H04N 5/7441; H04N 5/7458;
(Continued)

(56) References Cited

U.S. PATENT DOCUMENTS 9,462,241 B2 * 10/2016 Guthrie ................ H04N 9/3182
10,935,371 B2    3/2021 Walke et al.
(Continued)

FOREIGN PATENT DOCUMENTS

ES          2883171 T3   12/2021
WO   WO-2009032346 A1    3/2009

OTHER PUBLICATIONS

Mehajabin, Nusrat, et al. "Reducing Cinema Projectors Power Consumption Using Global Dimming and Image Statistics", Barco, Oct. 16-19, 2023 Hollywood California, 2023 Society of Motion Picture & Television Engineers (SMPTE)—MTS Manuscript.
(Continued)

*Primary Examiner* — Nitin Patel
*Assistant Examiner* — Amen W Bogale
(74) *Attorney, Agent, or Firm* — PERRY + CURRIER INC.

(57) ABSTRACT

A projector includes a light modulator, and a controller communicatively coupled to: an image source that provides frames to drive the light; and a light source arranged to illuminate the modulator according to colors. The controller, for a given image frame and given color: determines headroom of highest brightness pixels of the given frame, the headroom representing a difference between a peak brightness of a peak throughput of the modulator and a respective highest brightness associated with the highest brightness pixels; reduces a light source brightness to correspond to a peak light source brightness reduced by the headroom; controls highest brightness regions of the modulator to the peak throughput; and, based on reduced light source brightness, the controller controls lowest brightness regions of the modulator to a respective low-brightness throughput that maintains an about constant given low brightness output by the lowest brightness regions of the modulator across the frames.

14 Claims, 9 Drawing Sheets

(58) Field of Classification Search
CPC ...... H04N 9/3155; H04N 9/31; H04N 9/3111; H04N 9/3161; H04N 9/3182; G03B 21/00; G03B 21/2053; G09G 2320/0626; G09G 3/001; G09G 3/06; G09G 3/346
See application file for complete search history.

(56) References Cited

U.S. PATENT DOCUMENTS

| | | |
|---|---|---|
| 11,061,310 B2 | 7/2021 | D'Oosterlinck |
| 2008/0094426 A1 | 4/2008 | Kimpe |
| 2021/0127098 A1* | 4/2021 | Hu ..................... G03B 21/008 |

OTHER PUBLICATIONS

Mehajabin, Nusrat, et al. "Reducing Cinema Projectors Power Consumption Using Global Dimming and Image Statistics", Barco, Oct. 16-19, 2023 Hollywood California, 2023 Society of Motion Picture & Television Engineers (SMPTE)—PowerPoint.

* cited by examiner

DEVICE, SYSTEM AND METHOD FOR CONTROLLING A LIGHT SOURCE AND LOWEST BRIGHTNESS REGIONS OF A LIGHT MODULATOR

BACKGROUND

Power consumption and heat production at projectors, and especially cinema projectors, present technical challenges that may be mitigated using various techniques, including dimming of light sources for image frames that include highest brightness pixels that are less than a peak possible brightness. However such solutions may result in lowest brightness, and/or black, pixels, that change color as a brightness of the light sources change.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
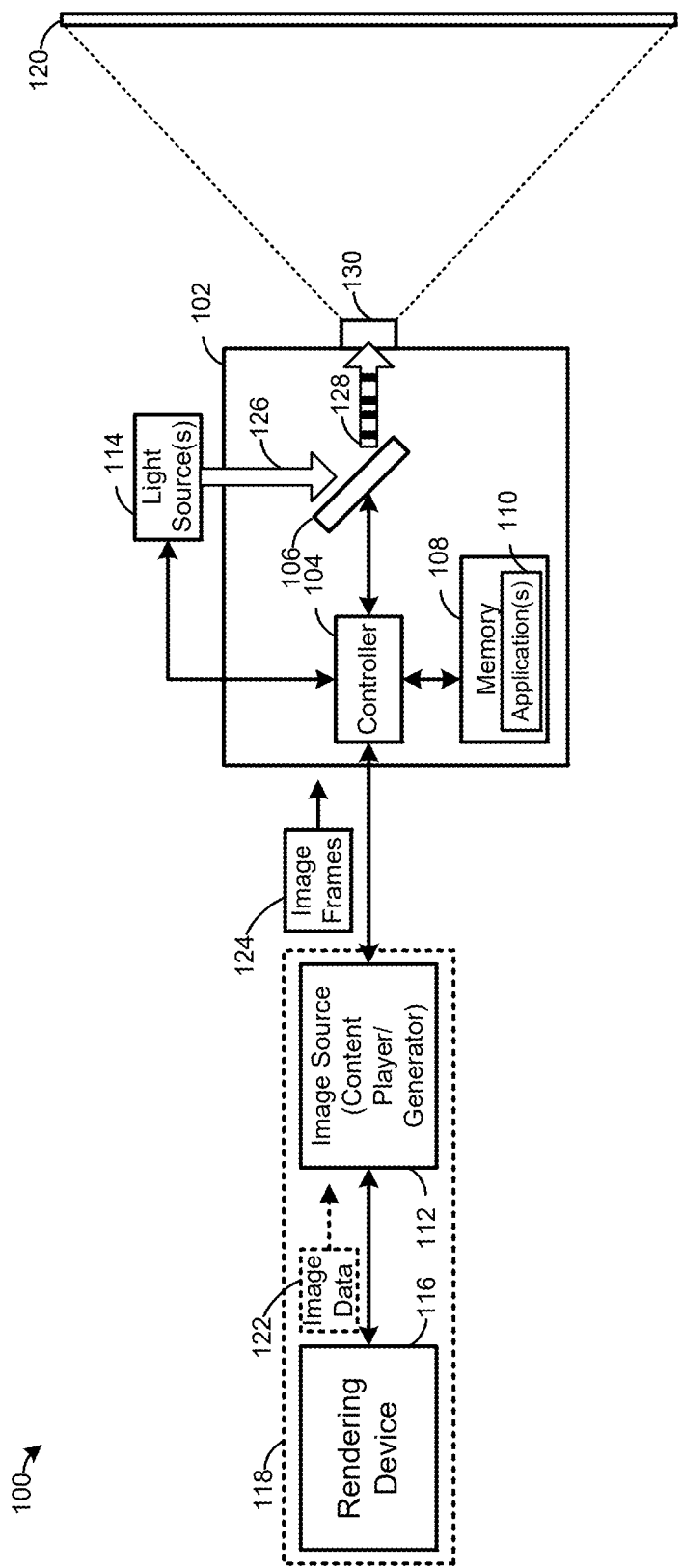
FIG. 1 depicts a system, according to non-limiting examples.

Power consumption and heat production at projectors, and especially high power/brightness cinema projectors, present technical challenges that may be mitigated using various techniques, including dimming of light sources for image frames that include highest brightness pixels that are less than a peak possible brightness. However such techniques may result in changes in color of lowest brightness and/or black pixels. As such, provided herein is an improved technical method, device, and system for controlling a light source and lowest brightness regions of a light modulator.

In particular, a projector is provided for controlling a light source and lowest brightness regions of a light modulator. The projector includes a light modulator and a controller communicatively coupled to: an image source that one or more of provides and receives image frames to drive the light modulator; and at least one light source arranged to illuminate the light modulator according to one or more colors. In some examples, one or more of the image source and the at least one light source may be external the projector, whereas in other examples, one or more of the image source and the at least one light source may be incorporated into the projector. The projector also generally includes projection optics for projecting light of the at least one light source modulated by the light modulator into projected images corresponding to the image frames, for example onto an object and/or a screen.

The controller, for a given image frame, of the image frames, and a given color, of the one or more colors, generally: determines a headroom of highest brightness pixels of the given image frame, the headroom representing a difference between a peak brightness associated with a peak throughput of the light modulator and a respective highest brightness associated with the highest brightness pixels; controls a light source brightness of the at least one light source to a reduced light source brightness corresponding to a peak light source brightness reduced by the headroom; and controls highest brightness regions of the light modulator, corresponding to the highest brightness pixels of the given image frame, to the peak throughput.

In a specific example, when highest brightness pixels of the given image frame, for a given color, are at 90% of a peak brightness, the headroom may be 10% (e.g. 100% minus 90%). When a light source of the given color is at 100% brightness, the light modulator may be controlled to a 90% peak throughput (e.g. or 90% duty cycle for light modulators that function according to pulsed width modulation (PWM), and the like, such as digital micromirror devices (DMDs), and the like). However, operating a light sources at 100% brightness leads to power consumption and heat production problems. Nonetheless, the headroom allows for dimming of the light source of the given color to achieve reduced power consumption and reduced heat production.

For example, continuing with the headroom of 10% example, a light source of the given color may be reduced to a brightness corresponding to a peak light source brightness reduced by the headroom of 10%. Correspondingly, the highest brightness regions of the light modulator, corresponding to the highest brightness pixels of the given image frame, may be controlled to a peak throughput and/or a highest duty cycle. Hence, when the given image frame is projected, with the light source of the given color dimmed to 90% of peak brightness, and the highest brightness regions of the light modulator controlled to a peak (e.g. 100%) throughput (e.g. duty cycle), highest brightness regions of a corresponding projected image are at 90% brightness. Such a process may be referred to as dynamic dimming and as the light source brightness is reduced, power consumption and heat production are also reduced at the light source.

Nonetheless, such dimming of the light source affects other regions of the given image frame, as projected. In particular, lowest brightness pixels of the given image frame, such as black pixels, will have also have their brightness reduced, and hence when the brightness of the light sources changes between image frames, due to different headrooms in the image frames, the lowest brightness and/or black pixels, as projected, will appear to change brightness from image frame to image frame. Furthermore, when such dynamic dimming occurs differently for red, green and blue light sources, the projected lowest brightness and/or black pixels will not only appear to change brightness from image frame to image frame, but may also appear to change color.

Hence, the controller is also generally configured to, based on the reduced light source brightness (e.g. from 100% to 90%), control lowest brightness and/or black regions of the light modulator, corresponding to lowest brightness and/or black pixels of the given image frame, to a respective low-brightness throughput that maintains an about constant given low brightness output by the lowest brightness regions of the light modulator across the image frames.

Put another way, and continuing with the 10% headroom example, the controller, having reduced the light source of the given color by 10% (and the like), may control throughput (e.g. and/or duty cycle) of the lowest brightness and/or black regions of the light modulator to a value that maintains a same brightness across lowest brightness and/or black regions from image frame to image frame. Such control generally maintains the lowest brightness and/or black regions of the light modulator across the image frames that is constant, so that projected black pixels do not change color.

For example, the about constant given low brightness may comprises a residual brightness of the light modulator in an off-state, when the light source brightness is at the reduced light source brightness, plus a determined respective brightness that brings the lowest brightness regions to the about constant given low brightness. Hence, continuing with the 10% headroom example, when the light source brightness is reduced by 10% (and the like), the residual brightness of the light modulator in an off-state is also generally reduced (e.g. by 10%).

As such, to maintain an about constant given low brightness (e.g. projected by the projector), a low-brightness throughput (e.g. duty cycle) of the lowest brightness and/or black regions of the light modulator is generally controlled to a given value that increases the brightness of projected lowest brightness and/or black pixels, to a given value. For example, when the residual brightness of the light modulator in the off-state is generally reduced by 10%, low-brightness throughput (e.g. duty cycle) of the lowest brightness and/or black regions of the light modulator may be increased by a determined amount, that brings the projected brightness of the lowest brightness and/or black pixels back to the given value. Such an adjustment further occurs from image frame to image frame to maintain the about constant given low brightness across the image frames.

The dimming of the light source is further understood to affect brightness of intermediate brightness pixels of the given image frame. As such, the controller is further understood to control respective throughputs of intermediate brightness pixels of the given image frame to respective intermediate-brightness throughputs to between the low-brightness throughput and the peak throughput, as a function of respective brightnesses associated with the intermediate brightness pixels. Such a function may be a linear function, though may be any suitable type of function.

An aspect of the present specification provides a method for implementation at a projector comprising a light modulator and a controller communicatively coupled to: an image source configured to one or more of provide and receive image frames to drive the light modulator; and at least one light source arranged to illuminate the light modulator according to one or more colors, the method comprising, for a given image frame, of the image frames, and a given color, of the one or more colors: determining, via the controller, a headroom of highest brightness pixels of the given image frame, the headroom representing a difference between a peak brightness associated with a peak throughput of the light modulator and a respective highest brightness associated with the highest brightness pixels; controlling, via the controller, a light source brightness of the at least one light source to a reduced light source brightness corresponding to a peak light source brightness reduced by the headroom; controlling, via the controller, highest brightness regions of the light modulator, corresponding to the highest brightness pixels of the given image frame, to the peak throughput; and based on the reduced light source brightness, controlling, via the controller, lowest brightness regions of the light modulator, corresponding to lowest brightness pixels of the given image frame, to a respective low-brightness throughput that maintains an about constant given low brightness output by the lowest brightness regions of the light modulator across the image frames.

Another aspect of the present specification provides a projector comprising: a light modulator; and a controller communicatively coupled to: an image source configured to one or more of provide and receive image frames to drive the light modulator; and at least one light source arranged to illuminate the light modulator according to one or more colors, the controller configured to, for a given image frame, of the image frames, and a given color, of the one or more colors: determine a headroom of highest brightness pixels of the given image frame, the headroom representing a difference between a peak brightness associated with a peak throughput of the light modulator and a respective highest brightness associated with the highest brightness pixels; control a light source brightness of the at least one light source to a reduced light source brightness corresponding to a peak light source brightness reduced by the headroom; control highest brightness regions of the light modulator, corresponding to the highest brightness pixels of the given image frame, to the peak throughput; and based on the reduced light source brightness, control lowest brightness regions of the light modulator, corresponding to lowest brightness pixels of the given image frame, to a respective low-brightness throughput that maintains an about constant given low brightness output by the lowest brightness regions of the light modulator across the image frames.

FIG. 1 depicts a system 100 comprising: a projector 102, the projector 102 comprising a controller 104, a light modulator 106 and a memory 108, the memory 108 storing one or more applications 110; an image source 112; and at least one light source 114. The controller 104 is understood to be communicatively coupled to the image source 112 and the at least one light source 114. The various components of the system 100 are in communication via any suitable combination of wired and/or wireless communication links, and communication links between components of the system 100 are depicted in FIG. 1, and throughout the present specification, as double-ended arrows between respective components.

As depicted, the image source 112 may be communicatively coupled to an optional rendering device 116, and the image source 112 (as depicted) may comprise a content player and/or content generator. As depicted, the rendering device 116 and the image source 112 may be combined into one device 118 (depicted in broken lines to represent such an optional combining of the rendering device 116 and the image source 112), however in other implementations the rendering device 116 and the image source 112 may be separate devices. While not depicted, the rendering device 116 and/or the device 118 may be communicatively coupled to an alignment system configured to generate pose data comprising at least data defining geometric relationships between, for example, the projector 102 and objects onto which the projector 102 projects, such as a screen 120 (and/or any other suitable objects, including objects on which projection mapping occurs). Generally, such pose data may comprise a location of the projector 102 (e.g. in "x,y,z" coordinates relative to an object and/or screen 120) and an orientation of the projector 102 (e.g. a "yaw", a "pitch" and a "roll" relative to an object and/or screen 120). In some examples, while not depicted, the system 100 may further comprise a camera for assisting at generating the pose data. Hereafter, for simplicity, reference will be made to projecting onto the screen 120, though projection may occur onto any suitable object.

When present, the rendering device 116 may generate rendered image data 122, for example by rendering existing image data (not depicted) for projection by the projector 102. The image data 122 may generally comprise two-dimensional images. The image source 112 may combine the image data 122 with the pose data (and any object data which may define a shape of an object and/or the screen 120) received from the alignment system to produce image frames 124, which comprises the image data 122 altered for a perspective for projection on an object by the projector 102. Alternatively, the image source 112 may receive the image frames 124 and "play" the image frames 124. Hence, the image source 112 is understood to one or more of generate and receive the image frames 124, and provide the image frames 124 to the controller 104 of the projector 102.

When the rendering device 116 and the image source 112 are separate, the rendering device 116 communicates the image data 122 to the image source 112, which processes and/or "plays" the image data 122 by producing the image frames 124 suitable for processing and projection by the projector 102.

The image data 122 may include, but is not limited to, an AVI file, a series of JPG files, a PNG file, and the like. The image frames 124 may include, but is not limited to, High-Definition Multimedia Interface (HDMI) data, Digital Visual Interface (DVI) data, DisplayPort (DP) data, Video over Internet Protocol (IP) data, Video Graphics Array (VGA) data, and/or video transport data.

When the rendering device 116 and the image source 112 are combined in the device 118, the device 118 may render the image frames 124 (e.g. video data) in real-time without producing the image data 122. In any event, the image frames 124 is communicated to the projector 102 by the image source 112 where the image frames 124 are used to control the projector 102 to project images based thereupon, for example onto a two-dimensional or three-dimensional object such as the screen 120. The image frames 124 may comprise images for projection onto the screen 120, for example the image data 122 altered for the perspective of the projector 102 relative to the screen 120, as determined using pose data and/or object data; however the image frames 124 may further comprise the pose data, extrinsic properties of the projector 102, settings for the projector 102, and the like.

The rendering device 116 generally comprises an image generator and/or renderer, for example a computing device, a server and the like, configured to generate and/or render images as the image data 122. Such the image data 122 may include, but is not limited to, still images, video and the like. Furthermore, though not depicted, the rendering device 116 may be in communication with, and/or comprise, an image generator and/or a memory storing data from which the image data 122 may be generated and/or rendered. Alternatively, the rendering device 116 may generate the image data 122 using algorithms, and the like, for generating images.

The image source 112 may comprise a player configured to "play" and/or render the image data 122. When the image data 122 comprises video data, the image source 112 is configured to play and/or render the video data by outputting the image frames 124 for projection by the projector 102. Hence, the image source 112 may include, but is not limited to a video player, a video processing device, a computing device, a server, and the like. However, as described above, when the rendering device 116 and the image source 112 are combined as the device 118, rendering of the image data 122 may be eliminated and the device 118 renders the image frames 124 without producing the image data 122.

The projector 102 comprises a projector configured to project the image frames 124, including but not limited to a digital projector, a cinema projector, a liquid crystal (LCD) based projector, an LCOS (Liquid Crystal on Silicon) based projector, a DMD (digital micromirror device) based projector and the like. Hence, the light modulator 106 may comprise any suitable corresponding type of light modulator, such as an LCS-based light modulator an LCOS light modulator, a DMD light modulator, and the like. In examples provided herein, for simplicity, reference will be made to the light modulator 106 comprising a DMD.

Furthermore, while only one the projector 102 is depicted, system 100 may comprise a plurality of projectors, each configured to project respective projection data comprising, for example, portions of larger tiled image to be projected.

Regardless of a technology used in the projector 102, it is assumed that the projector 102, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

The at least one light source 114 (interchangeably referred to herein, for simplicity, as the light source 114) may comprise any suitable light source arranged to illuminate the light modulator 106 with light 126. For example, as depicted, the at least one light source 114 may be external to the projector 102, with an aperture in the projector 102 to accept the light 126 and/or any suitable optics between the at least one light source 114 provide the light 126 to the projector 102. However the light source 114 may alternatively be incorporated into the projector 102.

In particular, the light source 114 may comprise a laser light source and/or any other light source whose brightness may be controlled by the controller 104. In some examples, the light source 114 may comprise a red light source, a green light source, and a blue light source (e.g. a red laser, a green laser and a blue laser), which may be controlled to successively illuminate the light modulator 106 with red light, green light and blue light, with the controller 104 correspondingly controlling the light modulator 106 to generate red image frames, green image frames and blue image frames in the projected modulated light 128, projected onto the screen 120 (and the like) via projection optics 130 of the projector 102 (e.g. the projector 102 further comprises the projection optics 130), with such projection represented by broken lines between the projections optics 130 and the screen 120.

Alternatively, the light 126 may be white and the projector 102 may comprise suitable optics for separating the light 126 into red, green and blue. Alternatively, while only one light modulator 106 is depicted, the projector 102 may comprise three light modulators 106, each dedicated to modulating red light, green light and blue light, with the controller 104 controlling the three light modulators 106 as described herein.

While each of the rendering device 116, the image source 112 (and/or the device 118), and the light source 114 are depicted as components distinct from the projector 102, in other implementations, respective portions of one or more of the rendering device 116, the image source 112 (and/or the device 118), and the light source 114, may be incorporated into the projector 102, and/or the entire system 100 may be provided as the projector 102.

The controller 104 may comprise a processor and/or a plurality of processors, including but not limited to one or more central processors (CPUs) and/or one or more graphics processing units (GPUs) and/or one or more processing units; either way, the controller 104 comprises a hardware element and/or a hardware processor. In some implementations, the controller 104 may comprise an ASIC (application-specific integrated circuit) and/or an FPGA (field-programmable gate array) specifically configured for controlling a light source and lowest brightness regions of a light modulator (e.g. the light modulator 106). Indeed, the controller 104 may preferably not be a controller, but a controller specifically configured to implement specific functionality for controlling a light source and lowest brightness regions of a light modulator (e.g. the light modulator 106). For example, the controller 104 may specifically comprise a computer executable engine configured to implement functionality for controlling a light source and lowest brightness regions of a light modulator.

The memory 108 may comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the projector 102 as described herein are typically maintained, persistently, in the memory 108 and used by the controller 104 which makes appropriate utilization of volatile storage during the execution of such programming instructions. Those skilled in the art recognize that the memory 108 is an example of computer readable media that may store programming instructions executable on the controller 104. Furthermore, the memory 108 is also an example of a memory unit and/or memory module and/or a non-volatile memory.

Figure 2:
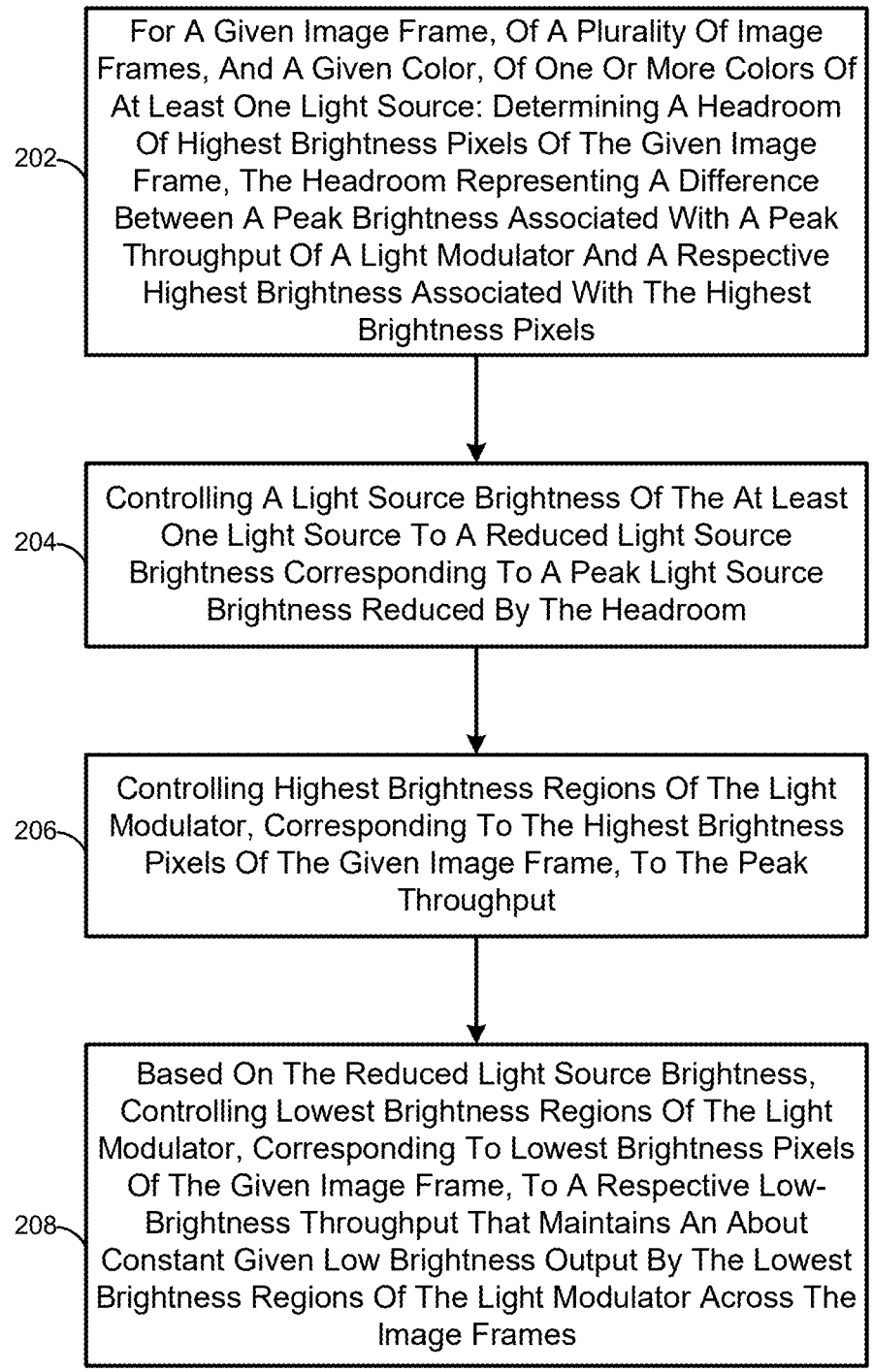
FIG. 2 depicts a method for controlling a light source and lowest brightness regions of a light modulator, according to non-limiting examples.

In particular, the memory 108 stores one or more applications 110 (referred to hereafter for simplicity as the application 110) that, when processed by the controller 104, enables the controller 104 and/or the projector 102 to implement the blocks of a method described herein with respect to FIG. 2.

While not depicted, the projector 102 may further comprise an any suitable wired or wireless communication interface(s) that enables the controller 104 to communicate with other components of the system 100 external to the projector 102. Such an interface or interfaces may communicate in a wired and/or wireless manner as desired including, but not limited using cables, WiFi™ communication links, Bluetooth™ communication links, personal area networks, local area networks, and the like.

Attention is now directed to FIG. 2 which depicts a flowchart of a method 200 for controlling a light source and lowest brightness regions of a light modulator according to non-limiting examples. The operations of the method 200 may correspond to machine readable instructions that are executed by the projector 102, and specifically the controller 104 of the projector 102. In the illustrated example, the instructions represented by the blocks of FIG. 2 are stored at the memory 108 for example, as the application 110. The method 200 of FIG. 2 is one way in which the controller 104 and/or the projector 102 and/or the system 100 may be configured. Furthermore, the following discussion of the method 200 of FIG. 2 will lead to a further understanding of the system 100, and its various components The method 200 of FIG. 2 need not be performed in the exact sequence as shown and likewise various blocks may be performed in parallel rather than in sequence. Accordingly, the elements of method 200 are referred to herein as "blocks" rather than "steps."

The method 200 of FIG. 2 may be implemented on variations of the system 100, as well. However, in the following description it is understood that the projector 102 comprises the light modulator 106; and the controller 104 communicatively coupled to: the image source 112 configured to one or more of provide and receive image frames 124 (and subsequently provided to the controller 104) to drive the light modulator 106; and the at least one light source 114 arranged to illuminate the light modulator 106 according to one or more colors.

At a block 202, the controller 104 and/or the projector 102, for a given image frame 124, of the image frames 124, and a given color, of the one or more colors produced by the light source 114, determines a headroom of highest brightness pixels of the given image frame 124, the headroom representing a difference between a peak brightness associated with a peak throughput of the light modulator 106 and a respective highest brightness associated with the highest brightness pixels. It is further understood that the remaining blocks of the method 200 are implemented with respect to the a given image frame 124 and the given color of the block 202.

As used herein, the term "peak throughput" is understood to comprise the light modulator 106 being controlled (e.g. by the controller 104) to a state where a pixels thereof provide a maximum amount of light from the light source 114 to the screen 120. Similarly, a pixel of the light modulator 106 being controlled to a peak throughput may comprise that pixel being controlled to a state where the pixel provides a maximum amount of light from the light source 114 to the screen 120. Similarly, a pixel of the light modulator 106 being controlled to a minimum throughput may comprise that pixel being controlled to a state where the pixel provides the lowest amount of light from the light source 114 to the screen 120. Throughputs of pixels may be between a minimum throughput and a peak throughput.

It is understood that the respective highest brightness associated with the highest brightness pixels is generally less than the peak brightness (e.g. as otherwise the headroom would be 0%).

At a block 204, the controller 104 and/or the projector 102, controls a light source brightness of the at least one light source 114 to a reduced light source brightness corresponding to a peak light source brightness reduced by the headroom.

At a block 206, the controller 104 and/or the projector 102, controls highest brightness regions of the light modulator 106, corresponding to the highest brightness pixels of the given image frame 124, to the peak throughput.

At a block 208, the controller 104 and/or the projector 102, based on the reduced light source brightness, controls lowest brightness regions of the light modulator 106, corresponding to lowest brightness pixels of the given image frame 124, to a respective low-brightness throughput that maintains an about constant given low brightness output by the lowest brightness regions of the light modulator 106 across the image frames 124.

It is understood that lowest brightness pixels of the given image frame 124 may correspond to black pixels.

It is further understood that the method 200 may occur for the plurality given image frame 124 and for all of the one or more colors produced by the light source 114, for example in parallel, such that a respective about constant given low brightness is maintained for projected pixels, for all of the one or more colors, across all the image frames 124 for respective lowest brightness pixels of the one or more colors, so that a brightness and color of respective lowest brightness pixels, as projected, does not change across the image frames 124.

It is further understood that the method 200 may be implemented dynamically, for example as the image frames 124 are received, and/or that the method 200 may be implemented prior to projection of the image frames 124, with various respective reduced light source brightnesses, determined at the blocks 202, 204, for the image frames 124 stored at the memory 108 (e.g. as a module of the application 110) in association with respective low-brightness throughputs, determined at the block 208, that maintain an about constant given low brightness output by the lowest brightness regions of the light modulator across the image frames 124.

It is further understood that, for a given color, lowest brightness pixels are a same lowest brightness across the image frames 124. Hence, for example, when one image frame 124 has lowest brightness pixels of "0" (e.g. black, on a scale of 0 to 100 where "0" is pure black and "100" is pure white) whereas a second image frame 124 has lowest brightness pixels of "1" (e.g. a shade of gray), lowest brightness pixels of the second image frame 124 are treated as intermediate brightness pixels. However, when all the image frames 124 have no lowest brightness pixels of "0", such that the lowest brightness is "1", such pixels of brightness of "1" are treated as the lowest brightness pixels.

However, it is understood that the method 200 may be implemented for intermediate brightness pixels such that the controller 104 controls intermediate brightness regions of the light modulator, corresponding to intermediate brightness pixels of the given image frame, of a given intermediate brightness, to a respective intermediate-brightness throughput that maintains an about constant given intermediate brightness output by the intermediate brightness regions of the light modulator across the image frames.

Put another way, projected lowest brightness pixels of brightness "1" are controlled to a same projected brightness across the image frames 124.

The method 200 may comprise further features.

For example, the about constant given low brightness of the block 208 may comprise a residual brightness of the light modulator 106 in an off-state, when the light source brightness is at the reduced light source brightness, plus a determined respective brightness that brings the lowest brightness regions to the about constant given low brightness.

Figure 3:
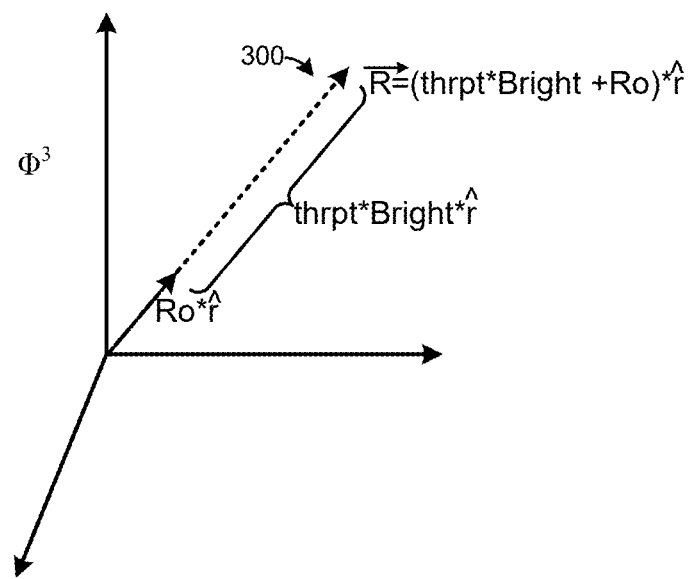
FIG. 3 depicts an example color vector of a projected pixel, according to non-limiting examples.

For example, attention is next directed to FIG. 3, which depicts an example color vector 300 of a projected pixel in a tristimulus space ($\Phi^3$). The vector 300 may represent a projected lowest brightness pixel, or a projected highest brightness pixel of a given image frame 124, or a projected intermediate brightness pixel (e.g. with a brightness intermediate between the projected lowest brightness pixel and the projected highest brightness pixel).

The vector 300 may be represented by:

$$\vec{R} = (thrpt * \text{Bright} + Ro) * \hat{r} \qquad \text{Equation (1)}$$

In Equation (1), $\vec{R}$ is the vector 300 and $\hat{r}$ is a direction of the vector 300 in tristimulus space ($\Phi^3$).

Also in Equation (1), "thrpt" is throughput of a pixel of the light modulator 106 that generates the vector 300, and may be a value between 0 and 1 (or between 0% and 100% and/or between 0 and 100, and/or any other suitable scale) which represents a portion of time that the pixel of the light modulator 106 is "on", and the like, in the given image frame 124. Hence, for values of "thrpt" of "0", the pixel of the light modulator 106 is "off" for the entire given image frame 124 and may generate a black projected pixel and/or a lowest-brightness projected pixel. Similarly, for values of "thrpt" of "1", the pixel of the light modulator 106 is "on" for the entire given image frame 124 and may generate a white projected pixel and/or a color projected pixel of highest brightness. For values of "thrpt" between "0" and "1", the pixel of the light modulator 106 is "on" for a portion of the given image frame 124 and may generate a gray projected pixel and/or a color projected pixel of intermediate brightness. For DMDs, and/or any other type of light modulator 106 that operates according to PWM (e.g. a DMD), throughput may alternatively be referred to as duty cycle. However, for other types of light modulators 106 that do not operate according to PWM (e.g. such as LCD-based light modulators and/or LCOS light modulators), the term throughput may be used (e.g. LCD-based light modulators and/or LCOS light modulators do not operate according to a duty cycle).

Also in Equation (1), "Bright" is the brightness of the light 126 of the color of the light source 114 illuminating the pixel of the light modulator 106 and may be a value between 0% and 100% (e.g. where 0% represents the light source 114 being off, and 100% represents the light source being at a peak, or maximum, brightness), however a value of "Bright" may be between 0 and 1, or between 0 and 100, or any other suitable scale.

Hence, the term "thrpt*Bright" is understood to represent the brightness of the projected pixel represented by the vector 300 that is due to the interaction of the light 126 with the pixel of the light modulator 106.

Also in Equation (1), Ro is the residual brightness of the light modulator 106 in an off-state, when the light modulator 106 is illuminated by the light 126. Hence, the residual brightness Ro generally represents the brightness of a black projected pixel when the throughput is "0". In an example described herein, Ro may be 0.001. Units of Ro and/or residual brightness may be the same units as the brightness "Bright" of Equation (1), and the units of $\vec{R}$ (e.g. the vector 300) may be any suitable units (e.g. while $\vec{R}$ and/or the vector 300 may be expressed as a percentage, as "thrpt*Bright" and Ro may be expressed as percentages, such percentages may be converted to any suitable brightness units, such as lux, and the like, for example by multiplying a value of $\vec{R}$ and/or the vector 300 by a maximum brightness, in lux (or any other suitable unit) of the light source 114. However, $\vec{R}$ and/or the vector 300 may be unitless, for example when performing the determinations thereof.

As such, in FIG. 3, the vector 300 is understood to be sum of a vector Ro*r̂, and a vector thrpt*Bright*r̂.

However, as the brightness "Bright" of the light 126 may change (e.g. at the block 204) due to changes in headroom, the residual brightness Ro may change from image frame 124 to image frame 124.

Hence, with reference to Equation (1), and assuming that, $\vec{R}$ is the about constant given low brightness of the block 208 of the method 200, as the residual brightness Ro changes from image frame 124 to image frame 124, and as a brightness "Bright" of the light 126 changes from image frame 124 to image frame 124, the throughput "thrpt" is controlled from image frame 124 to image frame 124 to a value that maintains $\vec{R}$ at a constant value across the image frames 124 for the lowest brightness pixels.

Put another way, at least the block 208 of the method 200 results in a change to a black point of the projector 102. In particular, the black point of the projector 102 may become brighter, as, for black pixels in an image frame 124, "black" no longer corresponds to residual brightness, but rather the residual brightness with the term "thrpt*Bright" added thereto, to maintain a constant value of $\vec{R}$ (e.g. a constant black point) for the black pixels across the image frames 124. Hence, there may be tradeoff between a brighter black point in exchange for reduced power usage and heat production.

Furthermore, it is understood that, for a set of image frames 124, a black point $\vec{R}$ of the black pixels may be based on the image frame 124 having the smallest headroom, with the black point (e.g. $\vec{R}$) increasing between sets of image frames 124, as the smallest headroom decreases. Put another way, and using a specific example, a first set of image frames 124 where the smallest headroom is 5%, will have a brighter black point than for a second set of image frames 124 where the smallest headroom is greater than 5%.

Put another way, the method 200 may further comprise, the controller 104 and/or the projector 102, as the reduced light source brightness changes from image frame 124 to image frame 124, due to changes in the headroom: changing the respective low-brightness throughput to maintain the about constant given low brightness of the lowest brightness regions of the light modulator 106, corresponding to lowest brightness pixels of the given image frame 124. In this manner, brightness and color of projected lowest brightness pixels are maintained across image frames 124.

A similar process may occur for the intermediate brightness pixels, such that projected intermediate brightness pixels corresponding to intermediate brightnesses pixels having the same brightness across the image frames 124, do not change in brightness or color across the image frames 124.

However, control of the intermediate brightness pixels may also occur using a function. For example, the method 200 may further comprise, the controller 104 and/or the projector 102, for intermediate brightness pixels of the given image frame 124, corresponding to respective intermediate brightnesses between a lowest brightness, associated with the lowest brightness pixels, and a highest brightness, associated with the highest brightness pixels: based on the value of the reduced light source brightness of the at least one light source 114, controlling respective throughputs of intermediate brightness regions of the light modulator 106, corresponding to the intermediate brightness pixels of the given image frame 124, to respective intermediate-brightness throughputs that maintain about constant respective given brightnesses output by the intermediate brightness regions of the light modulator 106 across the image frames 124.

The method 200 may further comprise, the controller 104 and/or the projector 102: controlling respective throughputs of intermediate brightness pixels of the given image frame 124 to respective intermediate-brightness throughputs to between the low-brightness throughput and the peak throughput, as a function of respective brightnesses associated with the intermediate brightness pixels.

For example, such a function may be linear, or may be any other suitable function.

When the function is linear, the method 200 may further comprise, the controller 104 and/or the projector 102: linearly controlling respective throughputs of intermediate brightness pixels of the given image frame 124 to respective intermediate-brightness throughputs to between the low-brightness throughput and the peak throughput, as a function of respective brightnesses associated with the intermediate brightness pixels.

Using a linear example, and with reference to Equation (1), and assuming that, $\vec{R}$ is a given brightness of a projected intermediate brightness pixel associated with given intermediate brightness pixels of the image frame 124, the throughput of the pixels of the light modulator 106 is controlled such that, in Equation (1), the term "thrpt*Bright" results in a same value of $\vec{R}$, for same intermediate brightness across the image frames 124. However, for different headrooms, the change in brightness of the light 126 is generally known and may linearly decrease as a function of headroom, and hence, as "Bright" linearly decreases, in Equation (1) "thrpt" may linearly increase for the given intermediate brightness. However, in some examples, as "Bright" linearly decreases, in Equation (1) "thrpt" may not linearly increase. This situation is described below with respect to FIG. 9 and others equation (e.g. Equations (7) to 11)) that better takes into account (e.g. relative to FIG. 1) relationships between brightness, residual brightness and control signals to the light modulator, and how such relationships affect throughput and/or light provided by the light modulator to the screen 120, and the like.

However, it is further understood that such examples have been simplified for illustrative purposes, and that $\vec{R}$ may be determined using matrix techniques, for example to take into account any other suitable factors that may contribute to brightness of projected pixels including, but not limited to, diffraction differences due to spatial patterning at the light modulator 106 when the light modulator 106 comprises a DMD, and the like as well changes to residual brightness due to changes in throughput.

Furthermore, in some examples, the at least one light source 114 may comprise a red laser, a green laser and a blue laser, and the method 200 may occur in parallel for the red laser, the green laser and the blue laser. For example, a respective headroom may be determined for each of the red laser, the green laser and the blue laser, for example from a red image frame component, a green image frame component and a blue image frame component of the given image frame 124 of the block 202 of the method 200. Furthermore in these examples, each of the red laser, the green laser and the blue laser are controlled (e.g. at the block 204 of the method 200) according to the respective headroom for each of the red laser, the green laser and the blue laser. Furthermore in these examples, respective throughputs for respective highest brightness pixels and respective lowest brightness pixels, for each of red, green, and blue, are controlled (e.g. at the block 206 and the block 208 of the method 200) according to the respective headroom for each of the red laser, the green laser and the blue laser.

Figure 4:
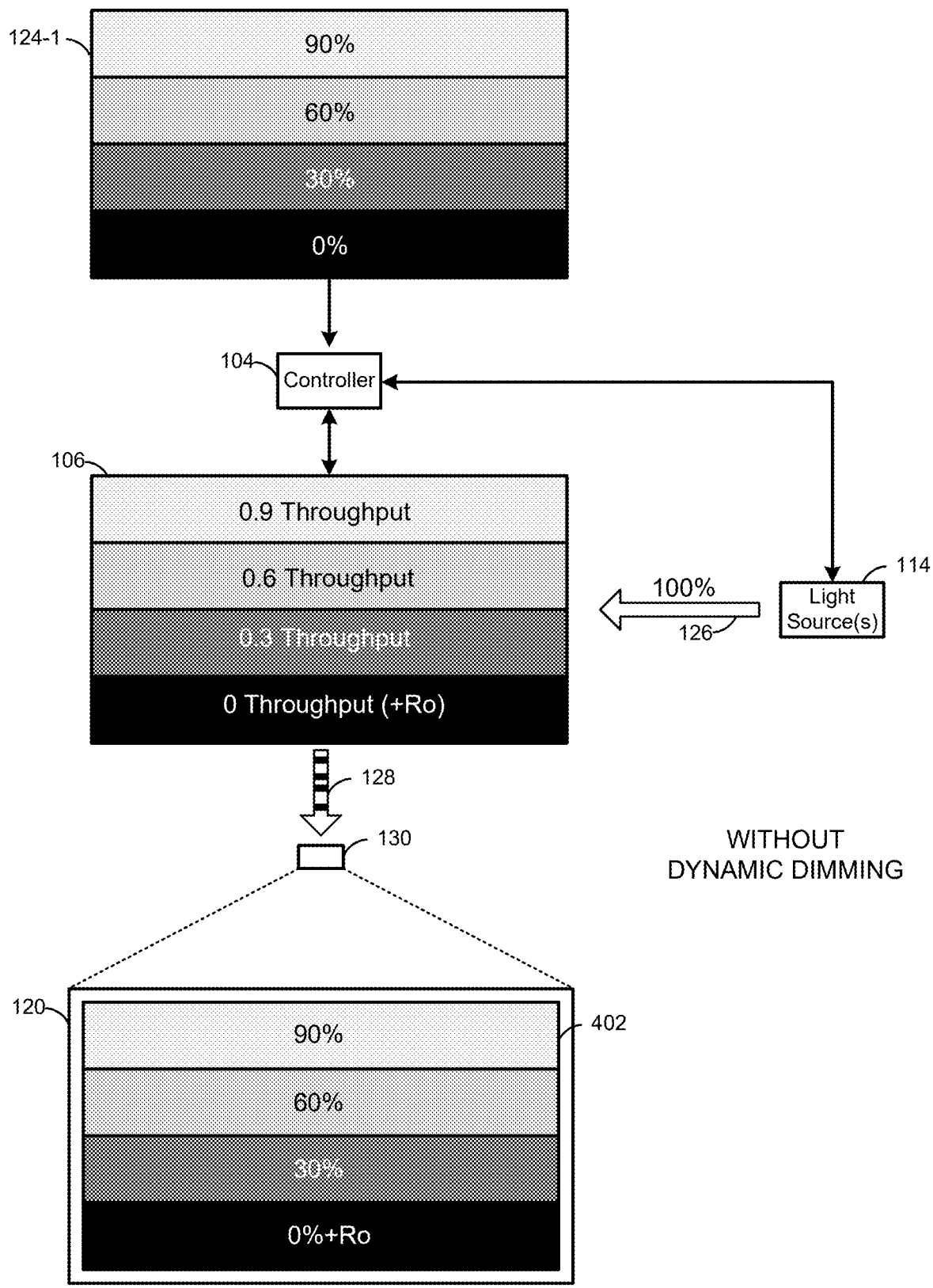
FIG. 4 depicts a portion of the system of FIG. 1, before controlling a light source and lowest brightness regions of a light modulator for a given image frame, according to non-limiting examples.
Figure 5:
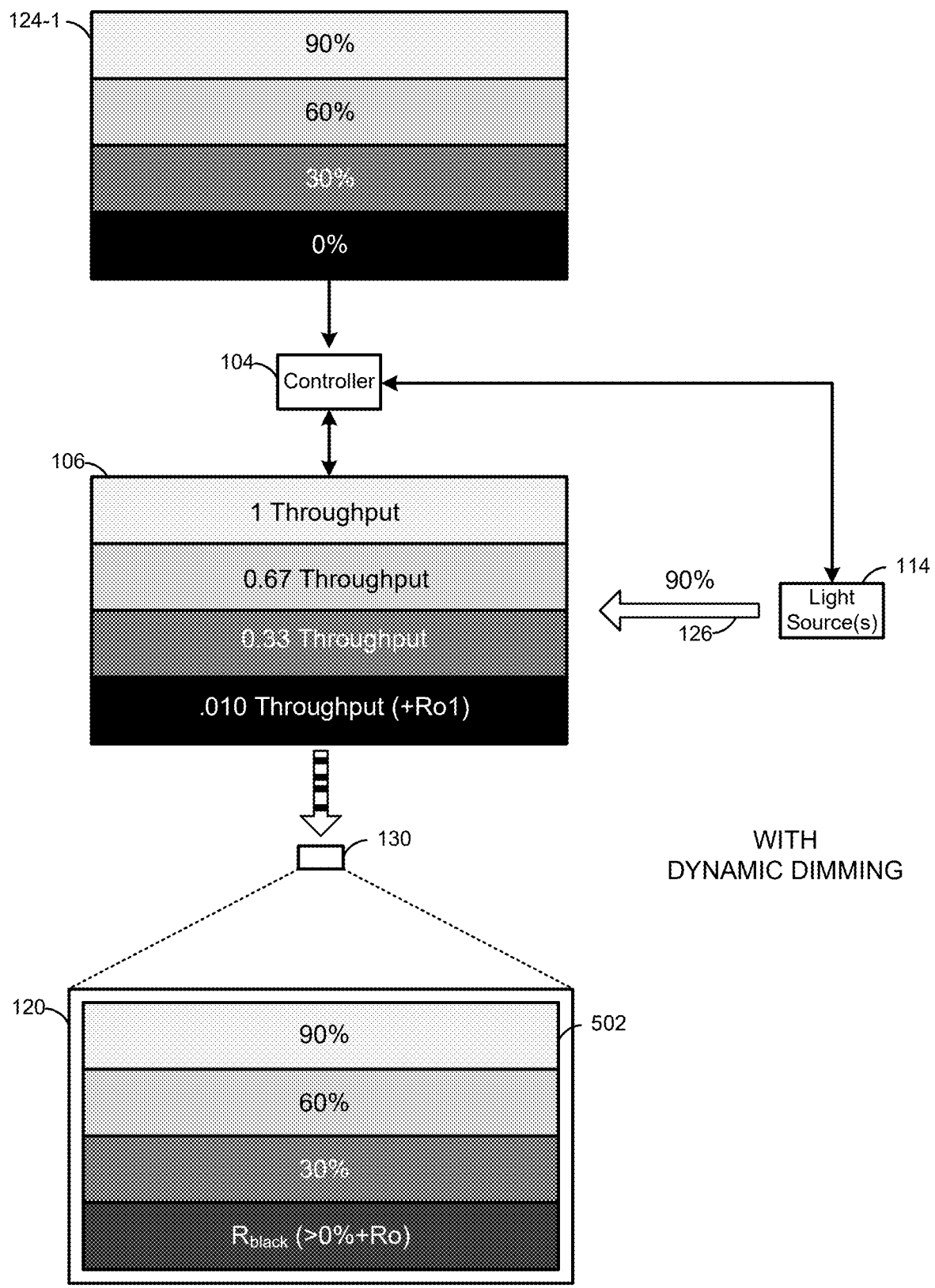
FIG. 5 depicts the portion of the system of FIG. 4, after controlling a light source and lowest brightness regions of a light modulator according to the given image frame, according to non-limiting examples.
Figure 6:
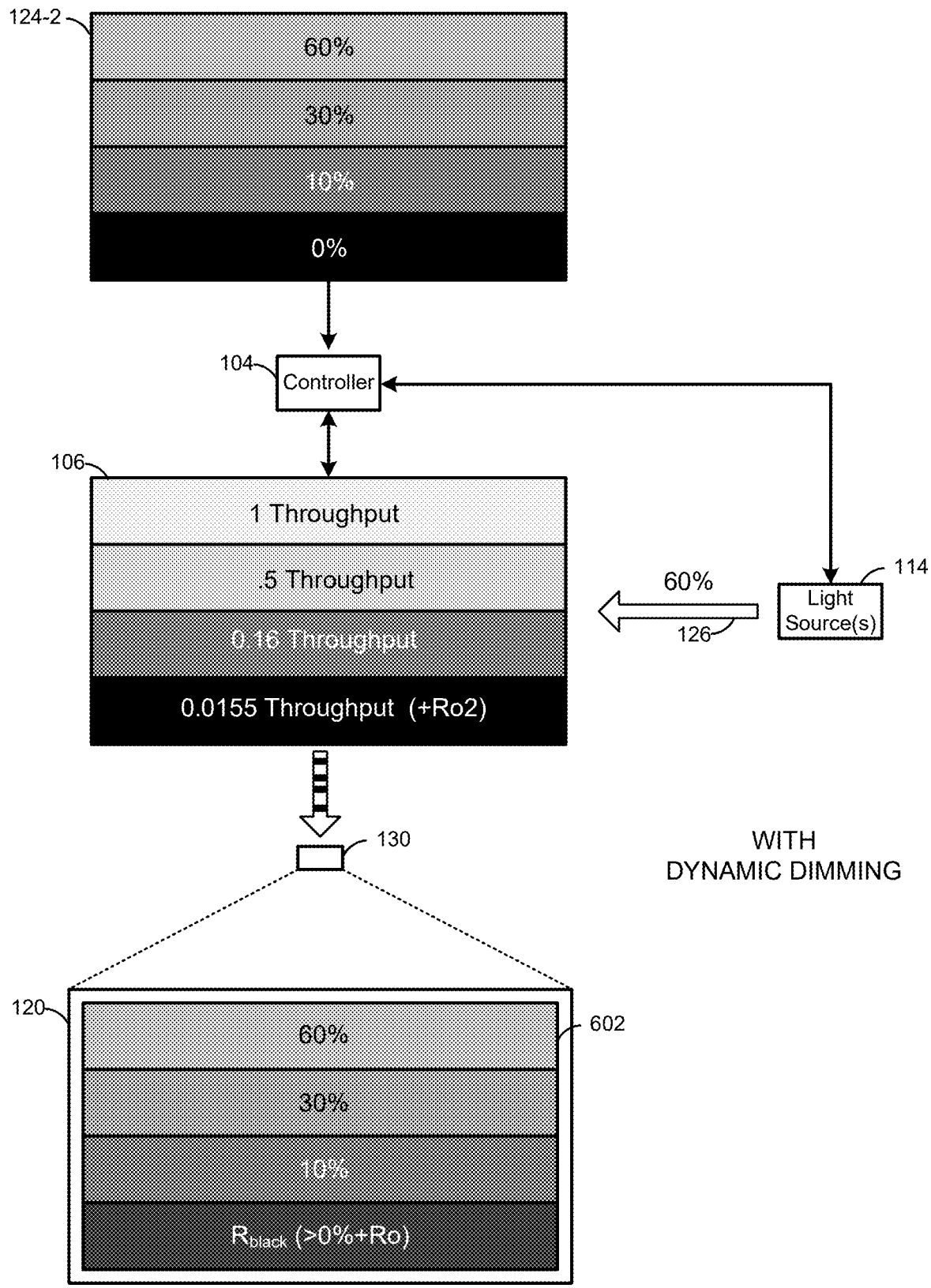
FIG. 6 depicts the portion of the system of FIG. 5, after controlling a light source and lowest brightness regions of a light modulator, but for another image frame according to non-limiting examples.

Attention is next directed to FIG. 4, FIG. 5, FIG. 6, which depict a portion of the system 100 being operated in different modes, and at least FIG. 5 and FIG. 6 depict an example of the method 200. In particular, FIG. 4 depicts a portion of the system 100 operating without implementing the method 200 (e.g. without dynamic dimming), and FIG. 5 and FIG. 6 depict a portion of the system 100 operating while implementing the method 200 (e.g. with dynamic dimming). While not all components of the system 100 is depicted in FIG. 4, FIG. 5, and FIG. 6, such components are nonetheless understood to be present.

Furthermore, FIG. 4 and FIG. 5 are depicted with a same image frame 124-1 of a test pattern with four bands of pixels corresponding to highest brightness pixels of 90% brightness, 60% brightness, 30% brightness and 0% brightness.

FIG. 6 is depicted with another image frame 124-2 of another test pattern with four bands of pixels corresponding to highest brightness pixels of 60% brightness, 30% brightness, 10% brightness and 0% brightness.

In all of FIG. 4, FIG. 5, and FIG. 6, the highest brightness pixels of the respective image frames 124 are understood to be less than a peak brightness of 100%, and the lowest brightness pixels of the respective image frames 124 are understood to be black pixels.

Turning first to FIG. 4, in the depicted mode, the system 100 may be operated without dynamic dimming, with regions of the light modulator 106 corresponding to the four bands of the image frame 124-1 controlled to respective throughputs corresponding to the brightness of the four bands (e.g. 0.9, 0.6, 0.3 and 0), and with the light source 114 controlled to a peak brightness of 100%.

As such, the modulated light 128 projected onto the screen 120 produces a projected image 402 comprising the four bands of the image frame 124-1.

However, with further reference to Equation (1), a residual brightness of $Ro_1$ of the region of the light modulator 106 that is controlled to a throughput of 0 is understood to contribute to the brightness of the black band of the projected image 402, for example as indicated by the text "0 Throughput (+Ro)" at the light modulator 106 and text "0%+Ro)" at the projected image 401). While such residual brightness $Ro_1$ also contributes to the other bands of the projected image 402, the higher the brightness, the less noticeable the residual brightness $Ro_1$, and hence, for simplicity, the residual brightness Ro is omitted in regions of the light modulator 106 corresponding to non-lowest brightness pixels of the image frame 124-1.

Attention is next directed to FIG. 5. In the depicted mode, the system 100 may be operated with dynamic dimming. Hence, FIG. 5 is similar to FIG. 4, but with the controller 104 implementing the method 200.

In these examples, as a peak brightness region of the image frame 124-1 (e.g. the same image frame as in FIG. 4) is 90%, there is headroom of 10% (e.g. as determined at the block 202 of the method 200). As such, the light source 114 is controlled (e.g. as determined at the block 204 of the method 200) to a reduced brightness of 90%, and the regions of the light modulator 106 corresponding to the four bands of the image frame 124-1 are controlled (e.g. as determined at the block 206 of the method 200) to respective throughputs that produce a projected image 502 that is similar to the projected image 402 at least in the corresponding 90%, 60% and 30% regions.

For example, a throughput of the region of the light modulator 106 corresponding to the highest brightness pixels of "90%" of the given image frame 124-1 is controlled to "1", a throughput of the region of the light modulator 106 corresponding to the next highest brightness pixels of "60%" the given image frame 124-1 is controlled to "0.67", and a throughput of the region of the light modulator 106 corresponding to the next highest brightness pixels of "30%" the given image frame 124-1 is controlled to "0.33".

In particular, ignoring the residual brightness, and using Equation (1), it is understood for the highest brightness pixels of "90%" of the given image frame 124-1, that the term "thrpt*Bright" for the example of FIG. 4 is "0.9*100%" (e.g. thrpt=0.9 and Bright=100%) or 90%, and similarly, for the example of FIG. 5, the term "thrpt*Bright" is "1*90%" (e.g. thrpt=1 and Bright=90%) or 90%.

Similarly, for the next highest brightness pixels of "60%" of the given image frame 124-1, the term "thrpt*Bright" for the example of FIG. 4 is "0.6*100%" (e.g. thrpt=0.6 and Bright=100%) or 60%, and similarly, for the example of FIG. 5, the term "thrpt*Bright" is "0.67*90%" (e.g. thrpt=0.67 and Bright=90%) or 60%.

Similarly, for the next highest brightness pixels of "30%" of the given image frame 124-1, the term "thrpt*Bright" for the example of FIG. 4 is "0.3*100%" (e.g. thrpt=0.3 and Bright=100%) or 30%, and similarly, for the example of FIG. 5, the term "thrpt*Bright" is "0.33*90%" (e.g. thrpt=0.33 and Bright=90%) or 30%.

Hence, in the example of FIG. 5, as compared to the example of FIG. 4, a reduced brightness and hence reduced power usage of the light source 114, with increased throughputs in the light modulator 106, similar and/or same results may be achieved to achieve similar projected images 402, 502.

However, with respect to the lowest brightness region of the given image frame 124-1, respective regions of the light modulator 106 are controlled (e.g. as determined at the block 208 of the method 200) to a throughput of 0.010 and, as such a throughput is low as compared to the throughputs of the other regions, the residual brightness is understood to more significantly contribute to the brightness of corresponding the projected image 502. It is understood that the throughput of 0.010 is selected to bring the brightness of the brightness of corresponding the projected image 502 up to a constant given low brightness of:

$$\overrightarrow{R_{Black}} = (thrpt1 * Bright1 + Ro1) * \hat{r} \qquad \text{Equation (2)}$$

Equation (2) is understood to be the same as Equation (1), but with the term $\overrightarrow{R_{Black}}$ that is selected to be constant from image frame 124 to image frame 124, and where "thrpt1" is the throughput of the respective regions of the light modulator 106 corresponding to the lowest brightness region of the given image frame 124-1, $Ro_1$ is the residual brightness of such respective regions of the light modulator 106, and "Bright1" is the brightness of the light 126 illuminating the light modulator 106 (e.g. Bright1=90%). $\hat{r}$ is the same as in Equation (1). Ro1 may be determined by multiplying Ro of Equation (1) by a gain factor, such as 90%, and such a gain factor may generally comprise 100% reduced by the headroom (e.g. of 10%).

It is further understood that a value of the term $\overrightarrow{R_{Black}}$ is larger than a similar term of the same lowest brightness region of the projected image 402 of FIG. 4, however the term $\overrightarrow{R_{Black}}$ is selected to be the same from image frame 124 to image frame 124. As such, the throughput "thrpt1" of the respective regions of the light modulator 106 corresponding to the lowest brightness region of the given image frame 124-1 is determined from the terms $\overrightarrow{R_{Black}}$, "Bright1" and "Ro$_1$". For example, using absolute values for Equation (2), (e.g., ignoring the term (r̂)), the throughput "thrpt1" may be determined from:

$$thrpt1 = (R_{Black} - Ro1)/\text{Bright1} \quad \text{Equation (3)}$$

Furthermore R$_{black}$ is understood to be greater than (0%+ Ro) and/or brighter than the corresponding band of the projected image 402.

Turning now to FIG. 6, the controller 104 continues to implement the method 200 for another image frame 124-2, however with pixels of brightness of 60%, 30%, 10% and 0%, to generate a projected image 602. Hence, the headroom is 40% (e.g. 100% minus 60%), and the controller 104 may control the light source 114 to a brightness of 60% (e.g. 100% minus the headroom of 40%).

As such the regions of the light modulator 106 corresponding to the four bands of the image frame 124-2 are controlled (e.g. as determined at the block 206 of the method 200) to respective throughputs that produce a projected image 602.

For example, a throughput of the region of the light modulator 106 corresponding to the highest brightness pixels of "60%" of the given image frame 124 is controlled to "1", a throughput of the region of the light modulator 106 corresponding to the next highest brightness pixels of "30%" of the given image frame 124 is controlled to "0.5", and a throughput of the region of the light modulator 106 corresponding to the next highest brightness pixels of "10%" of the given image frame 124 is controlled to "0.16".

In particular, ignoring the residual brightness, and using Equation (1), it is understood for the highest brightness pixels of "60%" of the given image frame 124-2, that for the example of FIG. 6, the term "thrpt*Bright" is "1*60%" (e.g. thrpt=1 and Bright=60%) or 60%, which would the same for a throughput of 0.6 and a brightness of 100% (e.g. when the system 100 is operated without dynamic dimming).

Comparing this example to the example of FIG. 5, for regions of the image modulator 106 corresponding to 60% brightness regions of the image frame 124-1, the throughput is increased from 0.67 to 1 due to the decrease in brightness of the light source 114. Hence, the corresponding "60%" bands in the projected images 502, 602 have a same and/or similar brightness as each have a brightness of 60%. It is again understood that these calculations are simplified and that matric calculations may occur to take into account other factors such as changes in the residual brightness due the decrease in the brightness of the light 126 from FIG. 5 to FIG. 6, amongst other factors.

Similarly, for the next highest brightness pixels of "30%" of the given image frame 124, for the example of FIG. 6, the term "thrpt*Bright" is "0.5*60%" (e.g. thrpt=0.5 and Bright=60%) or 30%, which would the same for a throughput of 0.3 and a brightness of 100% (e.g. when the system 100 is operated without dynamic dimming).

Comparing this example to the example of FIG. 5, for regions of the image modulator 106 corresponding to 30% brightness regions of the image frame 124-1, the throughput is increased from 0.33 to 0.5 due to the decrease in brightness of the light source 114. Hence, the corresponding "30%" bands in the projected images 502, 602 have a same and/or similar brightness as each have a brightness of 30%. It is again understood that these calculations are simplified and that matric calculations may occur to take into account other factors such as changes in the residual brightness due the decrease in the brightness of the light 126 from FIG. 5 to FIG. 6, amongst other factors.

Similarly, for the next highest brightness pixels of "10%" of the given image frame 124, for the example of FIG. 6, the term "thrpt*Bright" is "0.16*60%" (e.g. thrpt=0.16 and Bright=60%) or 10%, which would the same for a throughput of 0.1 and a brightness of 100% (e.g. when the system 100 is operated without dynamic dimming).

However, with respect to the lowest brightness region of the given image frame 124-2, respective regions of the light modulator 106 are controlled (e.g. as determined at the block 208 of the method 200) to a throughput of 0.014 and, as such a throughput is low as compared to the throughputs of the other regions, the residual brightness, is understood to more significantly contribute to the brightness of corresponding the projected image 602. It is understood that the throughput of 0.0155 is selected to bring the brightness of the brightness of the corresponding region the projected image 602 up to a constant given low brightness of:

$$\overrightarrow{R_{Black}} = (thrpt2 * \text{Bright2} + Ro2) * \hat{r} \quad \text{Equation (4)}$$

Equation (4) is understood to be the same as Equation (2), and the term $\overrightarrow{R_{Black}}$ has the same value of that of Equation (2) (e.g. selected to be constant from image frame 124 to image frame 124), and where "thrpt2" is the throughput of the respective regions of the light modulator 106 corresponding to the lowest brightness region of the given image frame 124-2, Ro$_2$ is the residual brightness of such respective regions of the light modulator 106 (e.g. but reduced relative to Equation (2) due the reduction in the brightness of the light 126 from FIG. 5 to FIG. 6), and "Bright2" is the brightness of the light 126 illuminating the light modulator 106, but reduced relative to Equation (2) (e.g. due the reduction in the brightness of the light 126 from FIG. 5 to FIG. 6). r̂ is the same as in Equation (1) and Equation (2). Ro2 may be determined by multiplying Ro of Equation (1) by a gain factor, such as 60%, and such a gain factor may generally comprise 100% reduced by the headroom (e.g. of 40%).

It is further understood that a value of the term $\overrightarrow{R_{Black}}$ is the same value as in Equation (2), the throughput "thrpt2" of the respective regions of the light modulator 106 corresponding to the lowest brightness region of the given image frame 124-2 is determined from the terms $\overrightarrow{R_{Black}}$, "Bright2" and "R$_{o2}$". For example, using absolute values for Equation (4), (e.g., ignoring the term (r̂)), the throughput "thrpt2" may be determined from:

$$thrpt2 = (R_{Black} - Ro2)/\text{Bright2} \quad \text{Equation (5)}$$

Hence, by selecting a value for the term "thrpt2" accordingly, and correspondingly controlling the throughput of the respective regions of the light modulator 106 corresponding to the lowest brightness region of the given image frame 124-2, to such a value, the brightness of the lowest brightness region of the projected image 602 is controlled to the same brightness of the lowest brightness region of the projected image 502.

For example, for Equation (2) and Equation (4), using respective throughputs of 0.010 and 0.0155, respective brightnesses of 90% and 60%, and respective residual brightnesses of 0.09 and 0.06 (e.g. using Ro of 0.001, $Ro_1$ may comprise Ro multiplied by a gain factor of 90%, $Ro_2$ may comprise Ro multiplied by a gain factor of 60%), the value of Rblack is the same value of 0.99.

Figure 7:
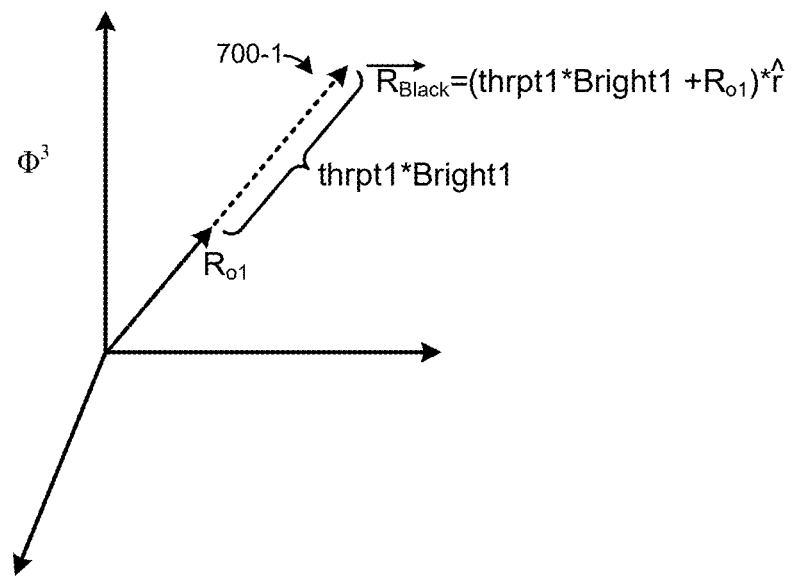
FIG. 7 depicts example color vectors for lowest brightness pixels of the image frames of the examples in FIG. 5 and FIG. 6, according to non-limiting examples.
Figure 7:
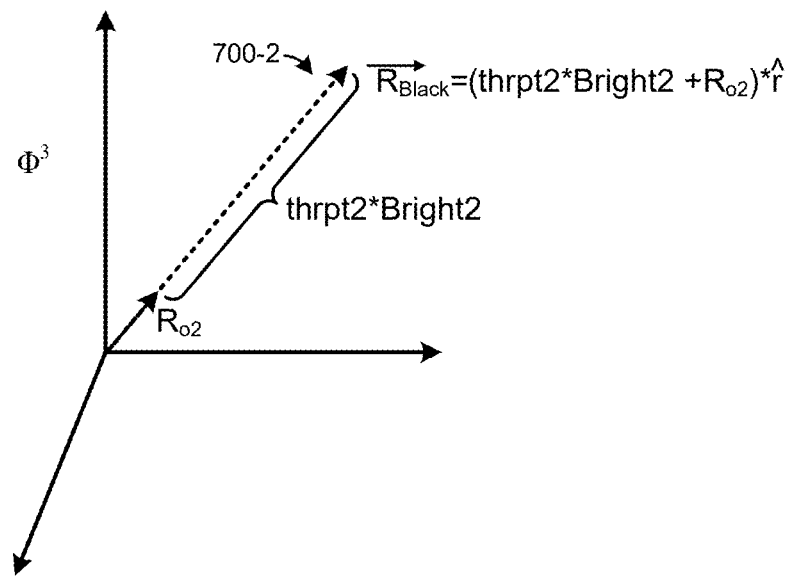

This is further explained in FIG. 7 which depicts vectors 700-1, 700-2 for $\overrightarrow{R_{Black}}$ for each of Equation (2) and Equation (4), the vectors 700-1, 700-2 being otherwise similar to the vector 300.

In particular, as has already been explained, the residual brightness $Ro_1$ for the vector 700-1 is larger than the residual brightness $Ro_2$ for the vector 700-2. Hence, to bring the vectors 700-1, 700-2 to a same value, the respective throughputs of thrpt1, thrpt2 are controlled such that the respective terms "thrpt1*Bright1", "thrpt2*Bright2" added to the respective residual brightnesses $Ro_1$, $Ro_2$ are result in the same value of $\overrightarrow{R_{Black}}$. A similar determination may occur for any intermediate brightness pixel and indeed any highest brightness pixels, such that projected pixels associated with the same brightness pixels of the image frames 124 are projected at the same brightness, regardless of the brightness of the light 126.

Figure 8:
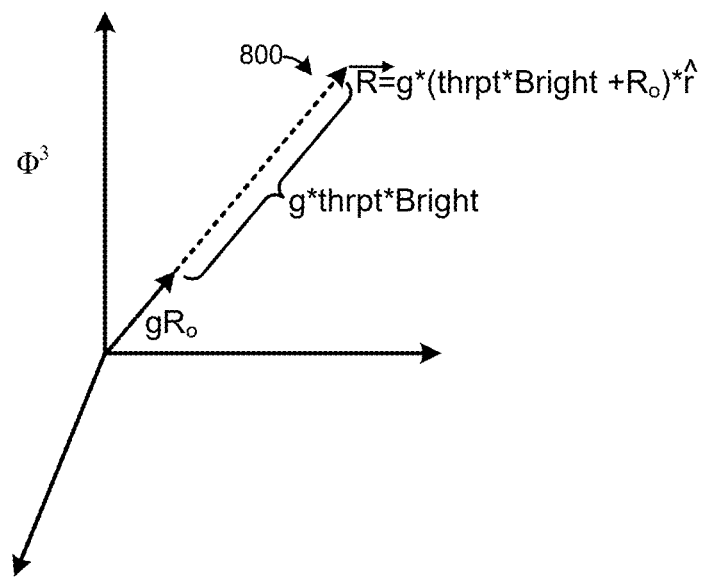
FIG. 8 depicts an example color vector of a projected pixel, including a gain factor, according to non-limiting examples.

Attention is next directed to FIG. 8, which depicts another vector 800 that is defined by Equation (6):

$$\vec{R} = g*(thrpt*\text{Bright} + Ro)*\hat{r} \qquad \text{Equation (6)}$$

The terms in Equation (6), with, however, a term "g" modifying the sum of (thrpt*Bright+Ro). The term "g" may be a gain factor between 0 and 1 indicating an amount by which the light source 114 is dimmed. Hence, Equation (6) may be a more generic version of Equation (1) (e.g. and/or Equation (2) and/or Equation (4)), assuming that, in Equation (6), the term "Bright" is understood to be 100% (e.g. 100% output of the light source 114), and the term Ro is understood to be the residual brightness when output of the light source 114 is at 100%. Indeed, as described above, $Ro_1$ and $Ro_2$ may be determined from Ro multiplied by respective gain factors of 0.9 and 0.6. The term "thrpt" may be variable, for example to maintain a constant value of $\vec{R}$, as the gain factor is reduced from "1" to less than "1".

For example, for g=0.9, the light source 114 may be dimmed by 10%, such that the output of the light source 114 is 90%, and the residual brightness Ro is dimmed by a same amount. As such, for a set of vectors $\vec{R}$, representing brightness of projected pixels of an image frame 124, by the controller 104 reducing "g" from 1 to a value less than 1, all of the vectors $\vec{R}$ are dimmed accordingly, with the respective throughputs adjusted to maintain the respective values of the set of vectors $\vec{R}$.

It is further understood that, as the light source 114 is dimmed, more contrast levels may be available at lower projected brightnesses, as same changes to the throughput at 100% brightness of the light source 114, and less than 100% brightness of the light source 114, may result in smaller changes to the projected brightnesses. For example, for a 0.1 change in throughput at 100% brightness of the light source 114, a 10% change in projected brightness occurs, whereas for a 0.1 change in throughput at 50% brightness of the light source 114, a 5% change in projected brightness occurs. Hence, more shades of gray may be available during dynamic dimming and/or during implementation of the method 200. Indeed, the controller 104, having dimmed the light source 114, may increase the available shades of gray for image frames 124, though such an increase may occur, in some examples, when such dimming is consistent over a portion of the image frames 124 that may correspond to a scene (e.g. of a video) to ensure that changes in gray levels do not fluctuate over the scene. For example, a file corresponding to the image frames 124 may be received and processed by any suitable component of the system 100 (e.g. the controller 104 and/or any of the components of the device 118) to determine image frames 124 that correspond to scenes where the method 200 may be applied to apply dynamic dimming, and add shades of gray accordingly to the image frames 124 (e.g. by adjusting such image frames 124 to include more shades of gray then were originally in the images frames 124, and the like).

Figure 9:
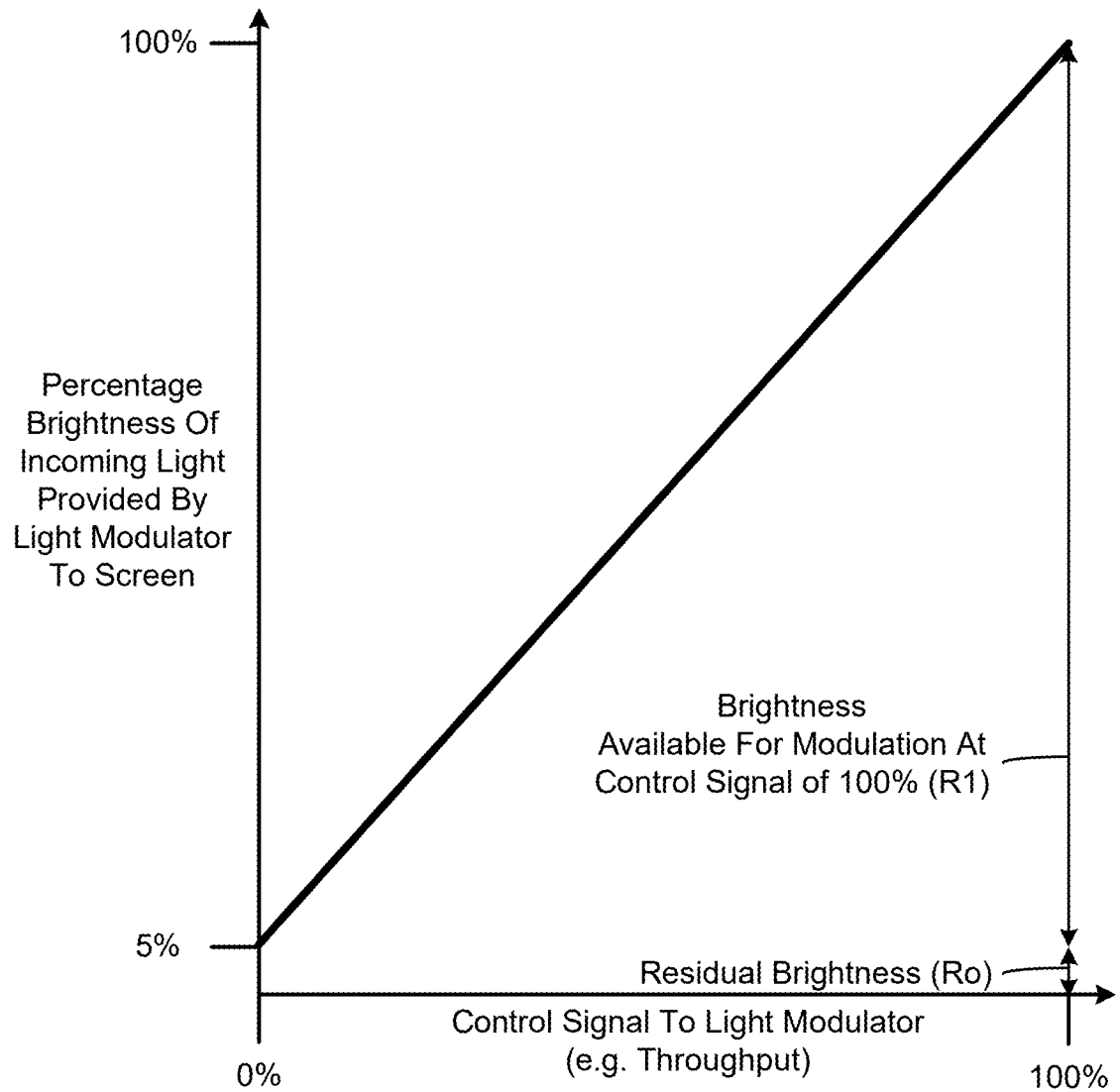
FIG. 9 depicts an example of controlling a pixel of the light modulator to take into account relationships between brightness, residual brightness and control signals to the light modulator, and how such relationships affect throughput and/or light provided by the light modulator to a screen, according to non-limiting examples.

Attention is next directed to FIG. 9 which depicts, percentage brightness of incoming light (e.g. from the light source 114) that is provided to the screen 104 by a pixel of the light modulator 130 changes as the controller 104 outputs a control signal to the light modulator to, the control signal attempting to control throughput of the light modulator to between 0% and 100% (and/or, as depicted, between 0 and 1, so that the control signal is unitless). As depicted, at a throughput of 0% (e.g. the pixel is controlled to be pure black), a residual brightness Ro of 5% of light from the light source 114 is still provided to the screen 120 by the light modulator 130. Indeed, a residual brightness Ro of 5% is maintained across all the throughputs from 0% to 100%, however, at 100% throughout, the brightness of the light from the light source 114, a modulation depth of the light modulator R1, that represents the light available for modulation, is only 95% of the light from the light source 114 (e.g. 100% minus the 5% of the residual brightness Ro). Hence, it is understood that Ro and R1 may be constants, and that, in a simple model, R1=100%−Ro.

Furthermore, the brightness output by light modulator 130 may be expressed in scalar terms (e.g. ignoring the aforementioned vectors):

$$L = (R1 \times C + Ro)*S \qquad \text{Equation (7)}$$

In Equation (7), L is the light produced by a pixel of the light modulator 130 (e.g. as provided to the screen 120), Ro is the residual brightness (e.g. 5% as in FIG. 9), R1 is the modulation depth (e.g. a percentage of modulated light output by the light modulator 130, and which may be constant defined by 100%−Ro), C is a value of the control signal for controlling throughput (e.g. and may range from 0 to 1, respectively corresponding to 0% throughout to 100% throughput, as in FIG. 9), and S is the percentage brightness of the light output by the light source 114.

As described herein, the light output by a pixel of the light modulator 130 to be the same at conditions "A" and "B". For example, under condition A, the control signal may be $C_A$ and the percentage brightness of the light output by the light source 114 may be $S_A$; for example, condition A may for regular operation where the light source 114 is controlled to 100%. Similarly, under condition B, the control signal may be $C_B$ and the percentage brightness of the light output by the light source 114 may be $S_B$; for example, condition B may be a condition where the light source 114 is dimmed Equation (7) may be rewritten for both these conditions as (e.g. for light $L_A$, $L_B$ respectively produced by a pixel of the light modulator 130 under conditions A and B):

$$L_A = (R1 \times C_A + Ro) * S_A \quad \text{Equation (8)}$$

$$L_B = (R1 \times C_B + Ro) * S_B \quad \text{Equation (9)}$$

Setting Equation (8) and Equation (9) to be equal, $L_A$, $L_B$ are equal under conditions A and B:

$$(R1 \times C_A + Ro) * S_A = (R1 \times C_B + Ro) * S_B \quad \text{Equation (10)}$$

Solving for $C_A$:

$$C_B = \frac{\left[\left[(R1 \times C_A + Ro) * \frac{S_A}{S_B}\right] - Ro\right]}{R1} \quad \text{Equation (11)}$$

Assuming condition A is a condition where brightness of the light source 114, $S_B$ is at 100%, but the control signal, $C_A$ is lower than 100%, and that in condition B, brightness of the light source 114, $S_B$ has been reduced from 100% based on the headroom (e.g. as per block 202 of the method 200), the control signal $C_B$, that maintains a same brightness (e.g. as in blocks 206 and 208 of the method 200, but for highest and lower brightness pixels) may be determined from Equation (11). For example, for highest brightness pixels, $C_B$ may be determined using $C_A$ set to a control signal for controlling pixels of the light modulator 114 to a highest brightness, whereas for lowest brightness pixels, $C_B$ may be determined using $C_A$ set to a control signal for controlling pixels of the light modulator 114 to a lowest brightness.

Indeed, Equation (11) illustrates that the relationships between brightness, residual brightness and control signals to the light modulator, and how such relationships affect throughput and/or light provided by the light modulator to the screen 120, may not be strictly linear.

As should by now be apparent, the operations and functions of the devices described herein are sufficiently complex as to require their implementation on a computer system, and cannot be performed, as a practical matter, in the human mind. In particular, computing devices such as set forth herein are understood as requiring and providing speed and accuracy and complexity management that are not obtainable by human mental steps, in addition to the inherently digital nature of such operations (e.g., a human mind cannot interface directly with digital projectors, nor project light, nor adjust throughput of a light modulator, etc.).

It is further understood that instance of the term "configured to", such as "a computing device configured to . . . ", "a processor configured to . . . ", "a controller configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations which may comprise the features that the computing device and/or the processor and/or the controller, and the like, are configured to implement. Hence, the term "configured to" is understood not to be unduly limiting to means plus function interpretations, and the like.

Furthermore, descriptions of one processor and/or controller and/or device and/or engine, and the like, configured to perform certain functionality is understood to include, but is not limited to, more than one processor and/or more than one controller and/or more than one device and/or more than one engine, and the like performing such functionality.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method for implementation at a projector comprising a light modulator and a controller communicatively coupled to: an image source configured to one or more of provide and receive image frames to drive the light modulator; and at least one light source arranged to illuminate the light modulator according to one or more colors, the method comprising, for a given image frame, of the image frames, and a given color, of the one or more colors:
    determining, via the controller, a headroom of highest brightness pixels of the given image frame, the headroom representing a difference between a peak brightness associated with a peak throughput of the light modulator and a respective highest brightness associated with the highest brightness pixels;
    controlling, via the controller, a light source brightness of the at least one light source to a reduced light source brightness corresponding to a peak light source brightness reduced by the headroom;
    controlling, via the controller, highest brightness regions of the light modulator, corresponding to the highest brightness pixels of the given image frame, to the peak throughput;
    based on the reduced light source brightness, controlling, via the controller, lowest brightness regions of the light modulator, corresponding to lowest brightness pixels of the given image frame, to a respective low-brightness throughput that maintains an about constant given low brightness output by the lowest brightness regions of the light modulator across the image frames; and
    as the reduced light source brightness changes from image frame to image frame, due to changes in the headroom:
        changing the respective low-brightness throughput to provide a determined respective brightness to maintain the about constant given low brightness of the lowest brightness regions of the light modulator, corresponding to lowest brightness pixels of the given image frame,
    wherein the about constant given low brightness comprises a respective residual brightness of the light modulator in an off-state, when the light source brightness is at the reduced light source brightness, plus the determined respective brightness that brings the lowest brightness regions to the about constant given low brightness, and
    wherein the lowest brightness pixels of the given image frame correspond to black pixels.

2. The method of claim 1, further comprising, for intermediate brightness pixels of the given image frame, corresponding to respective intermediate brightnesses between a lowest brightness, associated with the lowest brightness pixels, and a highest brightness, associated with the highest brightness pixels:
    based on a value of the reduced light source brightness of the at least one light source, controlling respective throughputs of intermediate brightness regions of the light modulator, corresponding to the intermediate brightness pixels of the given image frame, to respective intermediate-brightness throughputs that maintain about constant respective given brightnesses output by the intermediate brightness regions of the light modulator across the image frames.

3. The method of claim 1, further comprising:
    controlling respective throughputs of intermediate brightness pixels of the given image frame to respective intermediate-brightness throughputs to between the low-brightness throughput and the peak throughput, as a function of respective brightnesses associated with the intermediate brightness pixels.

4. The method of claim 1, further comprising:
    linearly controlling respective throughputs of intermediate brightness pixels of the given image frame to respective intermediate-brightness throughputs to between the low-brightness throughput and the peak throughput, as a function of respective brightnesses associated with the intermediate brightness pixels.

5. The method of claim 1, wherein the at least one light source comprises a red laser, a green laser and a blue laser,
    wherein a respective headroom is determined for each of the red laser, the green laser and the blue laser,
    wherein each of the red laser, the green laser and the blue laser are controlled according to the respective headroom for each of the red laser, the green laser and the blue laser, and
    wherein respective throughputs for respective highest brightness pixels and respective lowest brightness pixels, for each of red, green, and blue, are controlled according to the respective headroom for each of the red laser, the green laser and the blue laser.

6. The method of claim 1, wherein the light modulator comprises a digital micromirror device (DMD).

7. The method of claim 1, wherein the respective highest brightness associated with the highest brightness pixels is less than the peak brightness.

8. A projector comprising:
    a light modulator; and
    a controller communicatively coupled to: an image source configured to one or more of provide and receive image frames to drive the light modulator; and at least one light source arranged to illuminate the light modulator according to one or more colors,
    the controller configured to, for a given image frame, of the image frames, and a given color, of the one or more colors:
        determine a headroom of highest brightness pixels of the given image frame, the headroom representing a difference between a peak brightness associated with a peak throughput of the light modulator and a respective highest brightness associated with the highest brightness pixels;
        control a light source brightness of the at least one light source to a reduced light source brightness corresponding to a peak light source brightness reduced by the headroom;
        control highest brightness regions of the light modulator, corresponding to the highest brightness pixels of the given image frame, to the peak throughput;
        based on the reduced light source brightness, control lowest brightness regions of the light modulator, corresponding to lowest brightness pixels of the given image frame, to a respective low-brightness throughput that maintains an about constant given low brightness output by the lowest brightness regions of the light modulator across the image frames; and
        as the reduced light source brightness changes from image frame to image frame, due to changes in the headroom:
            change the respective low-brightness throughput to provide a determined respective brightness to maintain the about constant given low brightness of the lowest brightness regions of the light modulator, corresponding to lowest brightness pixels of the given image frame, wherein the about constant given low brightness comprises a respective residual brightness of the light modulator in an off-state, when the light source brightness is at the reduced light source brightness, plus the determined respective brightness that brings the lowest brightness regions to the about constant given low brightness, and wherein the lowest brightness pixels of the given image frame correspond to black pixels.

9. The projector of claim 8, wherein the controller is further configured to:

for intermediate brightness pixels of the given image frame, corresponding to respective intermediate brightnesses between a lowest brightness, associated with the lowest brightness pixels, and a highest brightness, associated with the highest brightness pixels:

based on a value of the reduced light source brightness of the at least one light source, control respective throughputs of intermediate brightness regions of the light modulator, corresponding to the intermediate brightness pixels of the given image frame, to respective intermediate-brightness throughputs that maintain about constant respective given brightnesses output by the intermediate brightness regions of the light modulator across the image frames.

10. The projector of claim 8, wherein the controller is further configured to:

control respective throughputs of intermediate brightness pixels of the given image frame to respective intermediate-brightness throughputs to between the low-brightness throughput and the peak throughput, as a function of respective brightnesses associated with the intermediate brightness pixels.

11. The projector of claim 8, wherein the controller is further configured to:

linearly control respective throughputs of intermediate brightness pixels of the given image frame to respective intermediate-brightness throughputs to between the low-brightness throughput and the peak throughput, as a function of respective brightnesses associated with the intermediate brightness pixels.

12. The projector of claim 8, wherein the at least one light source comprises a red laser, a green laser and a blue laser, wherein a respective headroom is determined for each of the red laser, the green laser and the blue laser, wherein each of the red laser, the green laser and the blue laser are controlled according to the respective headroom for each of the red laser, the green laser and the blue laser, and wherein respective throughputs for respective highest brightness pixels and respective lowest brightness pixels, for each of red, green, and blue, are controlled according to the respective headroom for each of the red laser, the green laser and the blue laser.

13. The projector of claim 8, wherein the light modulator comprises a digital micromirror device (DMD).

14. The projector of claim 8, wherein the respective highest brightness associated with the highest brightness pixels is less than the peak brightness.

\* \* \* \* \*